Jan. 21, 1958     C. F. ROBINSON     2,820,946
APPARATUS FOR LEAK DETECTION AND PRESSURE MEASUREMENT
Filed Feb. 1, 1954     2 Sheets-Sheet 2

INVENTOR.
CHARLES F. ROBINSON
BY
ATTORNEY

United States Patent Office 2,820,946
Patented Jan. 21, 1958

2,820,946

APPARATUS FOR LEAK DETECTION AND PRESSURE MEASUREMENT

Charles F. Robinson, Pasadena, Calif., assignor, by mesne assignments, to Consolidated Electrodynamics Corporation, Pasadena, Calif., a corporation of California Application February 1, 1954, Serial No. 407,321

8 Claims. (Cl. 324—33)

This invention relates to a method of leak detection which, in its preferred embodiment, comprises a combined method of leak detection and pressure measurement. The invention also relates to apparatus capable of simultaneous operation as a leak detector and ion gauge.

In present leak detection practice a system to be inspected may be evacuated while directing a stream of a so-called probe gas over the exterior surface of the system. The gas pumped out of the system is continuously analyzed and the appearance of the probe gas indicates the existence of leakage from the exterior to the interior of the system. Alternatively, and in some cases, a preferred method of leak detection is to pressurize a system with a gas consisting of or including a probe gas and probing the exterior surface of the system with analytical means to detect leakage of the probe gas from the interior to the exterior of the system.

The probe gas employed in either of these systems may be helium or, in general, any readily detectable gas which is foreign to the normal atmosphere within or without the system.

Presently, analysis of the gas, whether it be drawn from the interior or exterior of the system, is preferably accomplished by means of mass spectrometry in high sensitivity leak detection practice. A mass spectrometer is a complex and expensive instrument, and leak detection equipment utilizing this form of sensing represents an appreciable capital investment.

I have now discovered a method of leak detection which is characterized by the fact that it may be carried out with relatively inexpensive equipment. Moreover, I have devised apparatus for carrying out the method of the invention which, as stated, is relatively simple and which has the unique advantage of functioning not only in the performance of the leak detecting method but simultaneously as an ion gauge for measuring total pressure.

In one aspect, therefore, the invention contemplates a method for detecting leaks in a closed system which comprises exposing a wall surface, which term is used to denote either an inner or an outer wall surface of the system to a gas of the type which forms negative ions. If it is desired to expose an inner wall surface to a gas of this type, the system may be pressurized either with a particular gas or with a gas mixture including a desired concentration of the particular gas. If it is desired to expose an outer wall surface of the system to the probe gas, i. e. to the gas susceptible to the formation of negative ions, a small jet of the gas or of a gas mixture including the probe gas may be directed over the various portions of the system which are to be tested. The method of the invention further involves withdrawing a gas sample from a region adjacent the opposite face of the particular wall surface which is being exposed to the probe gas, ionizing the withdrawn gas in a region bounded by first and second spaced electrodes while maintaining the first electrode at a positive potential with respect to the second electrode, whereby positive ions migrate to the second electrode and negative ions to the first electrode. By sensing the resultant ion discharge at the first electrode, it is possible to detect the presence of the probe gas and therefore determine the existence of a leak, and by sensing the resultant ion discharge at the second electrode it is possible to determine the total ionization existing in the region of ionization which is a measure of the total pressure.

The invention also contemplates a combined leak detector and ion gauge comprising an evacuable envelope, means for admitting a gas to the envelope, a pair of electrodes disposed in the envelope in spaced relation, means for maintaining a first one of the electrodes at a positive potential with respect to the second one of the electrodes, means for causing an ionizing electron beam to traverse the region between the electrodes whereby the gas admitted to the envelope is ionized at least in part between the two electrodes, and means connected to measure the magnitude of ion discharge at each of the electrodes.

For the described apparatus to function both as a leak detector and ion gauge it is important that the absolute potential of the ionizing electron beam lie somewhere between the potentials of the two electrodes. If this is not the case and the region of the ionizing electron beam represents a potential trough, positive ions will be substantially prevented from access to one or the other of the electrodes and negative ions can be collected on either electrode.

The invention will be clearly understood from the following detailed description taken in conjunction with the accompanying drawing, in which.

Figure 1:
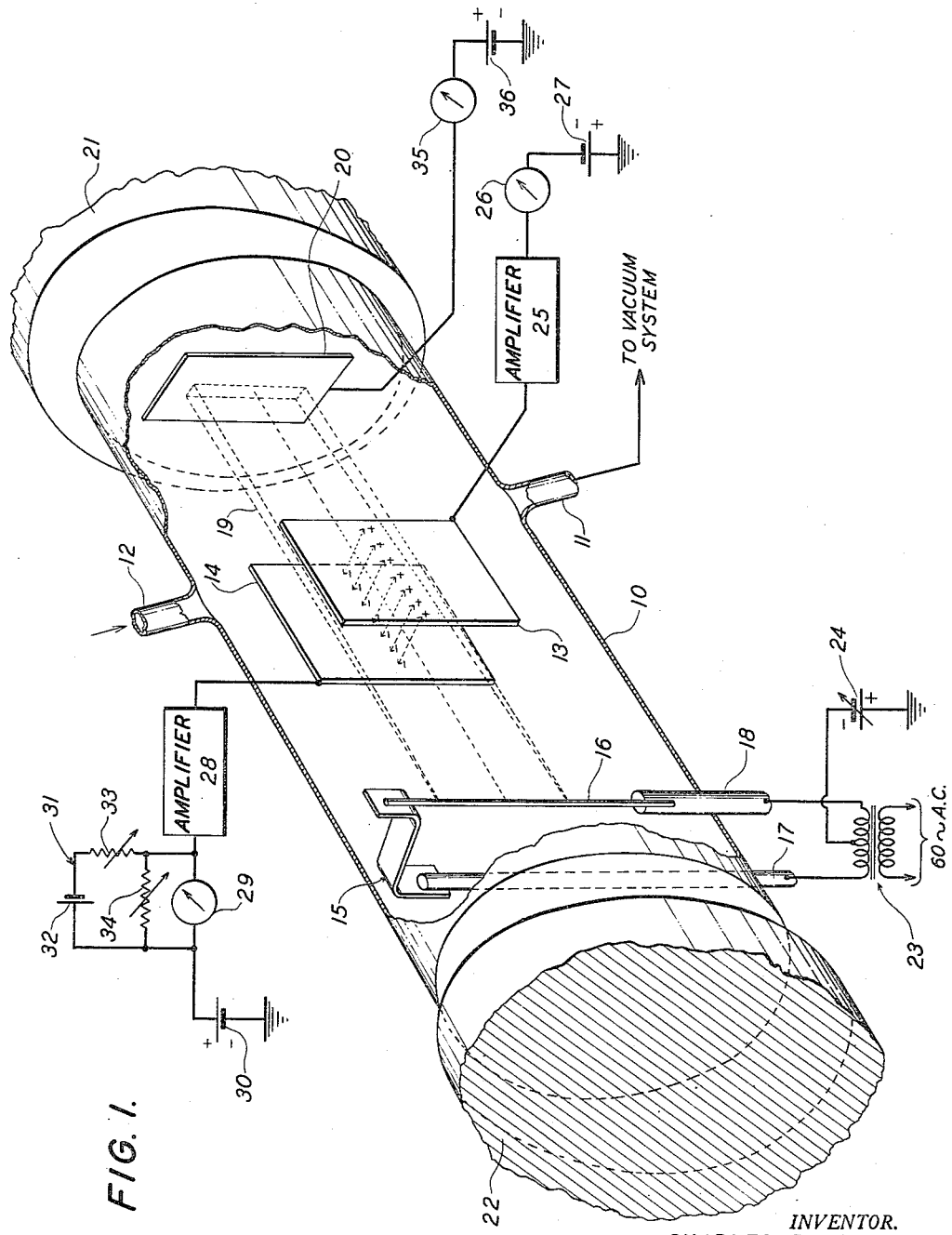
Fig. 1 is a view in perspective partially cut away of one form of apparatus in accordance with the invention.

Referring to Fig. 1, an envelope 10 is provided with an exhaust port 11 adapted to be interconnected to a vacuum system (not shown) and an inlet port 12 for admission of gas into the envelope. A pair of electrode plates 13, 14 are mounted in the envelope conveniently in transverse symmetrical alignment about the longitudinal axis of the envelope. An electron gun 15 is mounted adjacent one end of the envelope and includes an emitter 16 supported between leads 17, 18. The emitter 16 is positioned to direct an electron beam 19 longitudinally of the tube so as to substantially bisect the region between the plates 13 and 14. An electron target or anode 20 is mounted in the envelope opposite the emitter 16.

The envelope is immersed in a magnetic field oriented along the longitudinal axis of the envelope and produced either by a permanent magnet or an electromagnet schematically represented by pole pieces 21, 22. The magnetic field collimates the electron beam and prevents deflection toward the positive one of the electrode plates.

The external circuitry of the instrument is extremely simple. Starting with the electron gun, emitter 16 is connected through a transformer 23 to a 60-cycle A. C. source which furnishes the heating voltage for the emitter. Alternatively, the heating voltage may be supplied from batteries or any other conventional source. A variable voltage source 24 is connected to the center tap of the transformer 23 to produce an electron accelerating voltage at the emitter. The variable source may be either A. C. or D. C.

Plate 13 is connected to a low current amplifier 25, a meter 26, which may represent an ammeter or any form of conventional sensing device, and is biased as by a battery 27 to a negative potential with respect to the associated electrode 14. Electrode 14 is also connected to a low current amplifier 28 and a meter 29, which may be a milliammeter or other conventional sensory device, and is biased by a battery 30 to a positive potential.

A zero suppression circuit 31 is illustrated as connected across the meter 29 and includes a voltage source 32 connected in parallel across the meter, a first variable resistance 33 connected in series between the voltage source and the meter and a second variable resistance 34 connected in parallel between the voltage source and the meter, with the two variable resistances 33, 34, being ganged for uniform adjustment.

The anode 20 is connected to a bias battery 36, preferably through a current-measuring meter 35 so that ionizing conditions may be controlled.

The operation of the described apparatus is as follows: A gas admitted to the envelope 10 is ionized by the electron beam and positive ions will be drawn to the plate 13 where they discharge producing a current measurable in the illustrated amplification and sensing circuit. The current thus developed at plate 13 is a measure of the pressure in the chamber and the ionization cross-section of the gas, and the measurement of this current is equivalent in every way to the measurement of the anode current in conventional ionization gauges.

At the same time any negative ions which may be formed will be drawn to electrode 14, and the resultant current is detected and measured in the amplification and sensing system as illustrated. The current developed at electrode 14 by the discharge of negative ions is a measure of the partial pressure of gases from which negative ions are formed. If the gas admitted to the chamber is principally air, the current to plate 14 is a measure of the partial pressure of oxygen only, since nitrogen does not form negative ions. For this reason the illustrated apparatus is usable to perform the method of leak detection as herein described. If gas is withdrawn from a vacuum system in which there is a leak, the current developed at electrode 14 will increase by a factor of five if the probe gas admitted through the leak is changed from air to oxygen, or it will drop to zero if the gas admitted is changed from air to nitrogen. Even in this application the current developed at plate 13 still remains a measure of the pressure in the chamber so that the apparatus may be used as a combination ionization gauge and leak detector.

In order to maintain maximum differential sensitivity, i. e. maximum sensitivity to relatively small changes in gas composition, it is desirable to operate the sensing circuit associated with plate 14 such that the zero is suppressed. This may be accomplished by the zero suppression circuit 31 as described. In a vacuum system, and particularly one in which a leak may be intermittent, the partial pressure of oxygen may not be sufficiently stable to permit this mode of operation. In such event, the apparatus may be operated such that the kinetic energy of the electrons in the beam lies between 12 and 18 volts, or, alternatively, between zero and 6 volts within which range no negative ions are formed from oxygen. Under these conditions a probe gas which forms negative ions within either of these ranges of ionizing energies may be employed at high sensitivity without any interference from oxygen. Dichloro-difluoromethane is an example of a suitable probe gas usable in this application.

If it is desired to employ the method and apparatus of the invention in the so-called sniffer-type leak detector, that is, where a vessel or system to be tested is pressurized with the probe gas and the exterior explored with a probe adapted to bleed small samples of gas into the evacuable envelope, nitrogen is probably the most suitable probe gas. Nitrogen is abundantly available and is cheaper than helium, and since in this application the oxygen background is comparatively stable any increase in the connection of nitrogen (which is to say a decrease in the concentration of oxygen) appearing in the gas admitted to the apparatus produces a disproportionately large decrease in the ion current at electrode 14.

In employing the method and apparatus of the invention both as a leak detector and as an ion gauge where it is important that both positive and negative ions migrate respectively to the two plates, it is important that the electron beam be maintained at an absolute potential lying somewhere between the potentials of plates 13 and 14. In other words, it is important that the absolute potential of the electron beam be neither greater nor less than the potential of the two plates.

Figure 2:
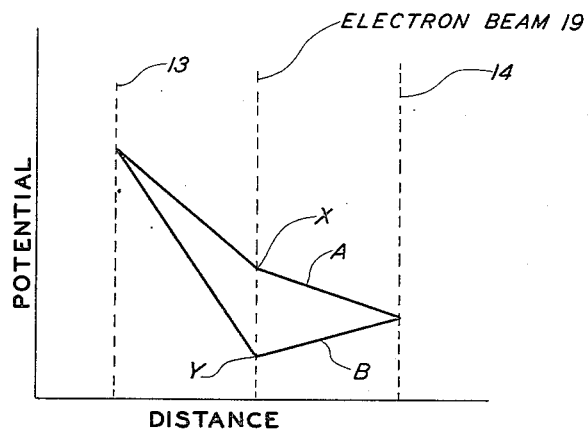
Fig. 2 is a graph illustrating the desirable and undesirable potential relationships between the two electrodes and the ionizing electron beam.

Fig. 2 is a graph showing potential plotted against the spacing of plates 13 and 14 and electron beam 19 illustrated in the graph as dotted lines. Curve A on the graph shows the desirable condition wherein the electron beam is at a potential X intermediate the potential of plates 13 and 14. Curve B of Fig. 2 illustrates the undesirable condition wherein the electron beam is at a potential Y which is negative with respect to both plates 13 and 14. Under this circumstance a positive ion trap is formed in the trough represented by the electron beam suppressing positive ion migration to plate 13 and permitting negative ions to strike either or both plates 13 and 14.

Figure 3:
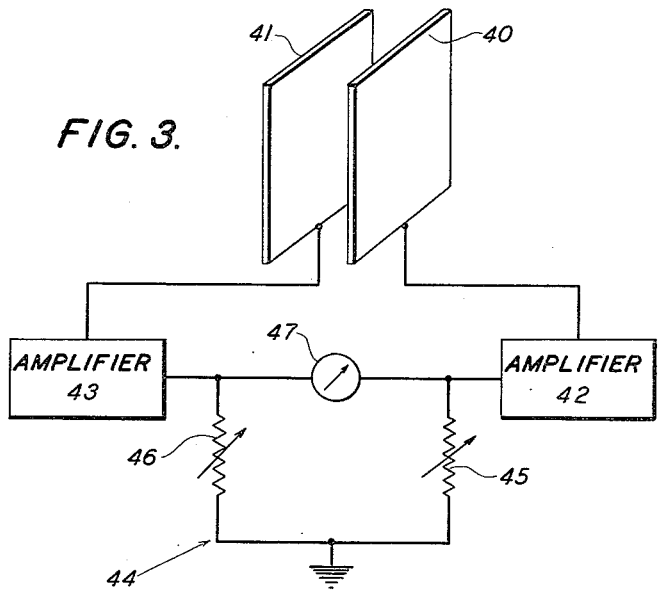
Fig. 3 is a circuit diagram showing an alternative form of measuring circuit connected to two electrodes of the type included in the apparatus of Fig. 1.

Fig. 3 is a simplified circuit diagram of a different form of circuit which may be embodied in the apparatus of Fig. 1. In the drawing a pair of ion collector plates 40, 41 are illustrated, it being assumed that these plates are supported in an evacuable envelope in the manner shown in Fig. 1 and with the same associated components. In this figure, however, the two plates are connected respectively through amplifiers 42, 43, the outputs of which comprise respectively two arms of a bridge network 44. The network 44 also includes variable resistors 45, 46 forming the other two arms of a conventional four-element bridge in which a null meter 47 is connected between opposite juncture points of the bridge. By this connection leak detection becomes unaffected by pressure changes within the system since any change in the partial pressure of a negative ion forming gas resulting from a proportionate change in the total pressure of the system will have no effect on the null meter 47. However, any change in the partial pressure of a negative ion-forming gas due to an increase in its concentration produced as a consequence of a leak in any of the manners above described will unbalance the bridge and cause a resultant deflection of the meter 47. In the figure it is assumed that amplifiers 42 and 43 have outputs of like sign when presented with signals of opposite sign.

The advantage of the method and apparatus of the invention over presently conventional leak detection practice is the fact that only one voltage, namely the electron accelerating voltage, need be regulated at all, and even the regulation of this voltage need not be very precise. As is apparent, the potentials on the ion collector plates, plates 13 and 14 in Fig. 1, may lie in any range in which efficient ion collection occurs. The magnetic field employed for collimating the electron beam need only be of the order of a few hundred gauss and, by conventional standards of mass spectrometry, may be very crude. The device has no critical dimensions and has considerable economic advantage for these reasons over the use of mass spectrometers for such determinations.

It is also within the contemplation of the invention to employ either A. C. or D. C. amplifiers in circuit with the ion collecting plates. In the embodiment illustrated in Fig. 1, amplifiers 25 and 28 are D. C. amplifiers. However, by the simple expedient of modulating the electron beam, as by provision of an A. C. voltage source instead of the D. C. source 24, the ion discharge current at the ion collector plates will be correspondingly modulated and is amplifiable with A. C. amplifiers.

I claim:
1. A combined leak detector and ion gauge comprising an evacuable envelope, means for admitting a gas to the envelope, a pair of plates disposed in the envelope in spaced relation, means for maintaining a first one of the plates at a positive potential with respect to the second one of the plates, means for causing an ionizing electron beam to traverse the region between the plates without striking either plate whereby the gas admitted to the envelope is ionized at least in part between the two plates, and means connected to each of the plates to measure the magnitude of ion discharge at the respective plates.

2. Apparatus according to claim 1 wherein the two plates are electrically connected in separate legs of a null balance bridge network, whereby the output of the bridge gives a measure of relative change in ion discharge at the two plates.

3. A combined leak detector and ion gauge comprising an evacuable envelope, means for admitting a gas to the envelope, a pair of plates disposed in the envelope in spaced relation, means for maintaining a first one of the plates at a positive potential with respect to the second one of the plates, means for causing an ionizing electron beam to traverse the region between the plates whereby the gas admitted by the envelope is ionized at least in part between the two plates, magnet means disposed to develop a magnetic field along an axis parallel to the plates to prevent electron migration to the plates, means spaced from the plate to separately collect the electrons passing between the plates, and means connected to each of the plates to measure the magnitude of ion discharge at the respective plates.

4. A leak detector comprising an evacuable envelope, means for admitting a gas to the envelope, a pair of plates disposed in the envelope in spaced relation, means for maintaining a first one of the plates at a positive potential with respect to the second one of the plates, means for causing an ionizing electron beam to traverse the region between the plates whereby the gas admitted to the envelope is ionized at least in part between the two plates, means preventing the electrons passing between the plates from migrating toward the plates, and means connected to the first plate to measure the magnitude of negative ion discharge at the plate.

5. A combined leak detector and ion gauge comprising an evacuable envelope, means for admitting a gas to the envelope, a pair of plates disposed in the envelope in spaced relation, means for maintaining a first one of the plates at a positive potential with respect to the second one of the plates, means for causing an ionizing electron beam to traverse the region between the plates whereby the gas admitted to the envelope is ionized at least in part between the two plates, means maintaining the electron beam at an absolute potential between that of the two plates, means preventing the electrons traveling between the plates from migrating to either of the plates and means connected to each of the plates to measure the magnitude of ion discharge at the respective plates.

6. Apparatus for detecting leaks in a system which comprises means for exposing a wall surface of the system to a gas of the type which forms negative ions, an evacuable envelope, means for withdrawing gas from the region adjacent the opposite face of the wall surface and admitting the withdrawn gas to the envelope, a pair of plates disposed in the envelope in spaced relation, means for maintaining a first one of the plates at a positive potential with respect to the second one of the plates, means for causing an ionizing electron beam to traverse the region between the plates without striking either plate whereby the gas admitted to the envelope is ionized at least in part between the two plates, and means connected to each of the plates to measure the magnitude of ion discharge at the respective plates.

7. Apparatus for detecting leaks in a system which comprises means for exposing a wall surface of the system to a gas of the type which forms negative ions, an evacuable envelope, means for withdrawing gas from the region adjacent the opposite face of the wall surface and admitting the withdrawn gas to the envelope, a pair of plates disposed in the envelope in spaced relation, means for maintaining a first one of the plates at a positive potential with respect to the second one of the plates, means for causing an ionizing electron beam to traverse the region between the plates whereby the gas admitted to the envelope is ionized at least in part between the two plates, means preventing the electrons passing between the plates from migrating toward the plates and means connected to the first plate to measure the magnitude of negative ion discharge at the plate.

8. Apparatus for detecting leaks in a system which comprises means for exposing a wall surface of the system to a gas of the type which forms negative ions, an evacuable envelope, means for withdrawing gas from the region adjacent the opposite face of the wall surface and admitting the withdrawn gas to the envelope, a pair of plates disposed in the envelope in spaced relation, means for maintaining a first one of the plates at a positive potential with respect to the second one of the plates, means for causing an ionizing electron beam to traverse the region between the plates whereby the gas admitted to the envelope is ionized at least in part between the two plates, means maintaining the electron beam at an absolute potential between that of the two plates, means preventing the electrons traveling between the plates from migrating to either of the plates, and means connected to each of the plates to measure the magnitude of ion discharge at the respective plates.

References Cited in the file of this patent
UNITED STATES PATENTS

| | | |
|---|---|---|
| 2,081,429 | Gaede | May 25, 1937 |
| 2,526,038 | Nelson | Oct. 17, 1950 |

OTHER REFERENCES

Radio News (Engineering Dept.), December 1945, pages 13 and 36.